Figure 1:
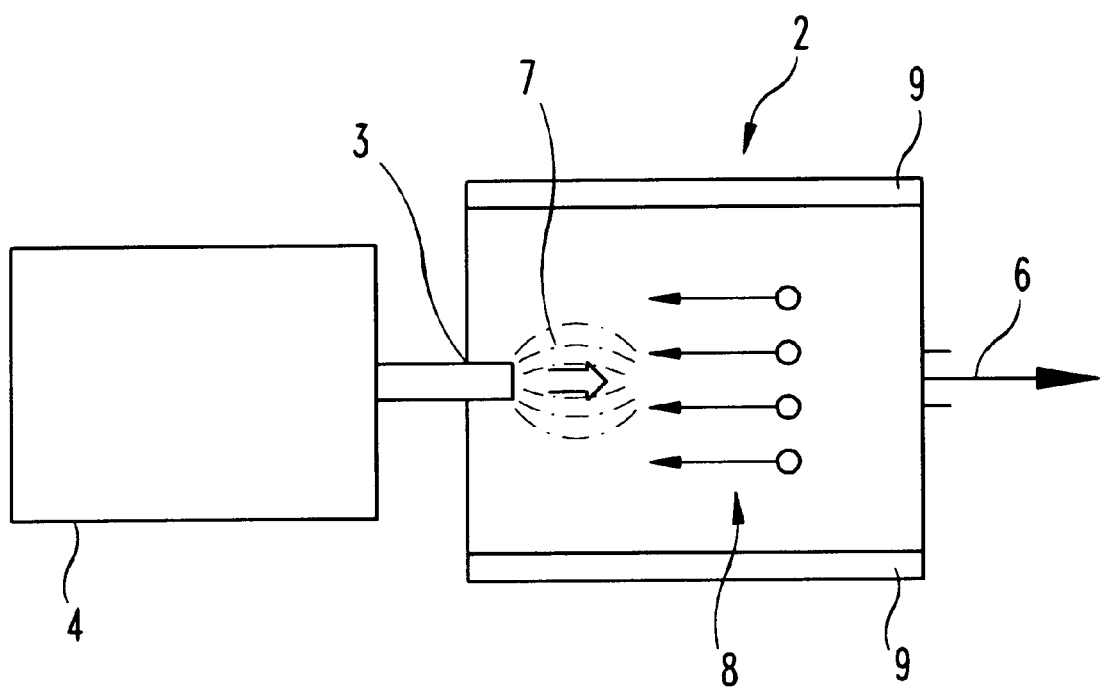

United States Patent [19]
Pui et al.

[11] Patent Number: 5,992,244
[45] Date of Patent: Nov. 30, 1999

[54] CHARGED PARTICLE NEUTRALIZING APPARATUS AND METHOD OF NEUTRALIZING CHARGED PARTICLES

[75] Inventors: David Y. H. Pui, Plymouth; Da-Ren Chen, Lauderdale, both of Minn.

[73] Assignee: Regents of the University of Minnesota, Minneapolis, Minn.

[21] Appl. No.: 09/034,433

[22] Filed: Mar. 4, 1998

[51] Int. Cl.⁶ .................................................. G01N 1/28
[52] U.S. Cl. .................................................... 73/865.5
[58] Field of Search ............................... 73/865.5, 61.72, 73/64.56; 324/71.4; 356/36, 37, 335, 336, 440; 250/288; 361/212, 213

[56] References Cited

U.S. PATENT DOCUMENTS

| | | |
|---|---|---|
| 3,521,125 | 7/1970 | Nelson . |
| 3,608,823 | 9/1971 | Buschor . |
| 4,039,145 | 8/1977 | Felici et al. . |
| 4,265,641 | 5/1981 | Natarajan . |
| 4,328,940 | 5/1982 | Malcolm . |
| 4,414,603 | 11/1983 | Masuda . |
| 5,247,842 | 9/1993 | Kaufman et al. . |
| 5,433,865 | 7/1995 | Laurent . |
| 5,475,228 | 12/1995 | Palathingal . |
| 5,621,605 | 4/1997 | Inaba et al. ........................... 361/213 |
| 5,683,556 | 11/1997 | Nomura et al. ....................... 361/213 |

FOREIGN PATENT DOCUMENTS

WO 93/07465  4/1993  WIPO .

OTHER PUBLICATIONS

Chen et al., "Electrospraying of Conducting Liquids for Monodisperse Aerosol Generation in the 4nm To 1.8 μm Diameter Range," *J. Aerosol Sci.*, 26(6), 963–977 (1995).

Chen et al., "Experimental Investigation of Scaling Laws for Electrospraying: Dielectric Constant Effect," *Aerosol Sci. Techn.*, 27, 367–380 (1997).

Adachi et al., "Unipolar And Bipolar Diffusion Charging of Ultrafine Aerosol Particles," *J. Aerosol Sci.*, 16(2), 109–123 (1985).

Adachi et al., "High–efficiency unipolar aerosol charger using a radioactive alpha source," *Aerosol Science, Idustry Health and Environment*, pp. 439–441, (Masuda and Takahashi, eds.), Pergamon Press, NY (1990).

Büscher et al., "Performance of a unipolar 'square wave' diffusion charger with variable nt–product," *J. Aerosol Sci.*, 25(4), 651–663 (1994).

Chen et al., "Design and Evaluation of a Nanometer Aerosol Differential Mobility Analyzer (Nano–DMA)," *J. Aerosol Sci.*, 29(5/6), 497–509 (1998).

Fuchs, "On the Stationary Charge Distribution on Aerosol Particles in a Bipolar Ionic Atmosphere," *Geodis:Pura. Appl.*, 56, 185–193 (1963).

Hoppel et al., "The Nonequilibrium Character of the Aerosol Charge Distributions Produced by Neutralizers," *Aerosol Sci. & Technol.*, 12, 471–496 (1990).

(List continued on next page.)

*Primary Examiner*—Robert Raevis
*Attorney, Agent, or Firm*—Mueting, Baasch & Gebhardt, P.A.

[57] ABSTRACT

Neutralizing a charged discharge includes providing a neutralizer housing having a longitudinal axis extending between an inlet and an outlet of the neutralizer housing. A charged discharge having a first polarity is introduced into the inlet of the neutralizer housing for flow parallel to the longitudinal axis from the inlet to the outlet. A stream of ions having a second polarity opposite the first polarity is directed to flow parallel to the longitudinal axis of the neutralizer housing towards the inlet for use in neutralizing the charged discharge. An electrode configuration is operable to create an electric field within the neutralizer housing for use in directing the stream of ions to flow parallel to the longitudinal axis of the neutralizer housing towards the inlet.

21 Claims, 8 Drawing Sheets

OTHER PUBLICATIONS

Lui et al., "On unipolar diffusion charging of aerosol particles in the continuum regime," *J. Colloid Interface Sci.,* 58, 142–149 (1977).

Pui et al., "Nanometer Particles: A New Frontier For Multidisciplinary Research," *J. Aerosol Sci.,* 28(4), 539–544 (1997).

Pui et al., "Unipolar Diffusion Charging Ultrafine Aerosols," *Aerosol Sci. Techn.,* 8, 173–187 (1988).

Romay et al., "Unipolar Diffusion Charging of Aerosol Particles at Low Pressure," *Aerosol Sci. Techn.,* 15, 60–68 (1991).

Romay et al., On the combination coefficient of positive ions with ultrafine neutral particles in the transition and free–molecule regimes, *Aerosol Sci. Techn.,* 17, 134–147 (1992).

Romay et al., "Free electron charging of ultrafine aerosol particles," *J. Aerosol Sci.,* 23(7), 679–692 (1992).

Wiedensohler et al., "A novel unipolar charger for ultrafine aerosol particles with minimal particle losses," *J. Aerosol Sci.,* 25(4), 639–649 (1994).

CHARGED PARTICLE NEUTRALIZING APPARATUS AND METHOD OF NEUTRALIZING CHARGED PARTICLES

STATEMENT OF GOVERNMENT RIGHTS

The present invention was made with government support from the National Science Foundation under Grant No. CTS-9304152. The Government has certain rights in this invention.

FIELD OF THE INVENTION

The present invention relates to the neutralization of charged particles. More particularly, the present invention pertains methods and apparatus for neutralizing charged particles using a flow of ions.

BACKGROUND OF THE INVENTION

Neutralization devices are currently available for use in neutralizing charged particles for a variety of applications, such as, neutralization of charged nanometer particles for use in the development of standards, the use of such neutralized particles for structured materials, the use of neutralized particles for biotechnology applications, etc. For example, a neutralization device is described in U.S. Pat. No. 5,247,842 (Kaufman et al.), entitled, "Electrospray Apparatus For Producing Uniform Submicrometer Droplets," issued Sep. 28, 1993. The neutralization device is used in combination with an electrospray device. In the electrospray device, electrically conductive liquid is supplied at a controlled rate to a capillary tube. A voltage differential between the capillary tube and a surrounding chamber wall creates an electrostatic field that induces a surface charge in the liquid emerging from the tube. Electrostatic forces disperse the liquid into a fine spray of charged droplets. To produce the spray, each droplet is charged to about 80–95% of the Rayleigh limit (at which point electrostatic repulsion overcomes surface tension). Such electrospray devices are used in many applications due to their ability to generate small and uniform droplets.

The electrically conductive liquid being sprayed is generally a liquid having particles dispersed therein. The particles, e.g., particles of a suspension, and the liquid is sprayed using the electrospray device to form a spray of small droplets. The droplets are then dried, and the particles are left in aerosol form. The particles, may then be, for example, studied or analyzed using downstream analysis devices, e.g., detectors and apparatus, such as differential mobility particle sizers (DMPS), differential mobility analyzers (DMA), electrometers, and condensation particle counters (CPC). The charged particles resulting from use of the electrospray device may have, for example, a nominal diameter of about 100 micrometers or less.

As liquid evaporates from the droplets, surface charge density on the droplets increases until the Rayleigh limit is reached, at which point the coulomb repulsive force becomes on the same order as cohesive forces, such as surface tension. The resulting instability causes the original droplet, sometimes referred to as the parent or primary droplet, to disintegrate into smaller droplets, thus, the resulting distribution of droplet size is broad, i.e., nonuniform. One solution to the problem is to neutralize the droplets and, as such, the particles.

As described in U.S. Pat. No. 5,247,842, a charged neutralizing device disposed proximate an electrospray discharge and along an evaporation region is used to provide the function of reducing an electrical charge of the droplets as the spray of droplets exits the electrospray device to prevent the droplets from disintegrating due to repulsive coulombic forces. For example, the electrospray device produces very highly charged aerosol particles which typically carry about 80%–95% of a Rayleigh limit of charge, on the order of 10–1,000 elementary units of charge.

As described in U.S. Pat. No. 5,247,842, a preferred neutralization process includes using a source of ionizing radiation (for example, radioactive polonium emitting alpha particles or a photon ionization source), or another source of ions, such as corona discharge. The source of ions is positioned proximate the electrospray discharge such that the droplets encounter the ions virtually immediately upon their formation. Additional sources of ions can be positioned further downstream along the evaporation region so that the droplets are further neutralized as they proceed downstream.

In such a device, the highly unipolarly charged particles, e.g., spray from the electrospray device, are exposed to the ions in the neutralizing device. However, more than 80% of the charged particles are lost within the neutralizer, e.g., to the walls, because of the high electric mobility of the particles. Further, such particles are lost due to the use of a high electric field needed for generating droplets encompassing the charged particles. The charged particles follow the high electric field from the point of generation to the walls and many are lost at the walls. Further, the space charge of the charged particles also cause the expansion of the stream of particles resulting in contact and loss to the walls. With such high charged particle loss, the amount of particles reaching the exit for provision to downstream devices, such as detection and characterization devices, is undesirably low.

SUMMARY OF THE INVENTION

In accordance with the present invention, a neutralizing apparatus is described. For example, the neutralizing apparatus may be used with an electrospray aerosol generator, such as an electrospray device that generates a discharge of droplets and/or particles, or may be used for the neutralization of any other sources which generate discharges with high charge levels. The neutralizing apparatus, according to the present invention, provides a flow of ions directed by an electric field. The flow of ions is counter to the flow of the charged particles/droplets of the discharge. As such, the discharge is immersed in the flow of directed ions resulting in rapid discharging of the highly charged discharge. Particle loss is thereby reduced.

A method for use in neutralizing a charged discharge according to the present invention includes providing a neutralizer housing having a longitudinal axis extending between an inlet and an outlet of the neutralizer housing. A charged discharge having a first polarity is introduced into the inlet of the neutralizer housing for flow parallel to the longitudinal axis from the inlet to the outlet. A stream of unipolar ions having a second polarity opposite the first polarity is directed to flow parallel to the longitudinal axis of the neutralizer housing towards the inlet for use in neutralizing the charged discharge.

In one embodiment of the method, the stream of unipolar ions is directed by creating a confined electric field within the housing parallel to the longitudinal axis such that the stream of unipolar ions are directed towards the inlet for use in neutralizing the charged discharge. Further, in another embodiment, the stream of unipolar ions is provided by positioning a radioactive source in proximity to the outlet of the neutralizer housing to generate bipolar ions. The confined electric field then directs ions of a first polarity forming the stream of unipolar ions in a flow parallel to the longitudinal axis of the neutralizer housing towards the inlet with bipolar ions remaining proximate the outlet. In yet another embodiment, a clean sheath is created between the charged discharge and the neutralizer housing.

A neutralizing apparatus according to the present invention is also described. The neutralizing apparatus includes an elongated neutralizer housing having a longitudinal axis extending between an inlet and an outlet defined therein. The inlet is for receiving a charged discharge. An electrode configuration is operable to create a confined uniform electric field within the neutralizer housing for use in directing a stream of unipolar ions to flow parallel to the longitudinal axis of the neutralizer housing towards the inlet.

In one embodiment of the apparatus, the apparatus further includes structure for creating a clean sheath between the charged discharge and the neutralizer housing. In another embodiment, the electrode configuration includes a plurality of ring electrodes located along the longitudinal axis and one or more power sources are used to apply a plurality of voltages ramped in level from a first ring electrode to a last ring electrode of the plurality of ring electrodes lying along the longitudinal axis. In yet another embodiment, the elongated neutralizer housing includes a nonconducting tube portion having an inner surface with the electrode configuration including a layer of resistive material having a first end and a second end located along a length of the inner surface. A power source is connected to apply a voltage to the first end with the second end grounded.

An apparatus for generating an aerosol according to the present invention is also provided. The apparatus includes a device for providing a charged discharge at an outlet thereof. The charged discharge includes electrically charged droplets having a first charge associated therewith. An evaporation neutralization housing is used to reduce the size of the droplets. The housing has an inlet and an outlet with the inlet proximate the outlet of the device which generates the charged discharge. An electrode configuration associated with the evaporation neutralization housing creates a uniform electric field within the housing for directing a stream of unipolar ions towards the inlet of the housing proximate the outlet of the device providing the charged discharge.

Another method for use in neutralizing a charged discharge according to the present invention includes providing a neutralizer housing having a longitudinal axis extending between an inlet and an outlet thereof. A charged discharge is introduced into the inlet of the neutralizer housing for flow parallel to the inlet of the longitudinal axis from the inlet to the outlet. An alternating electric field is created within the housing parallel to the longitudinal axis for directing bursts of negatively charged ions and positively charged ions alternately towards the inlet for use in neutralizing the charged discharge. An apparatus for carrying out this method is also described.

BRIEF DESCRIPTION OF THE DRAWINGS

FIG. 1 is a general block diagram of a charged particle source in conjunction with a neutralizing apparatus in accordance with the present invention.

FIG. 2 is a diagrammatical cross-sectional view of one illustrative embodiment of a particle neutralizing apparatus in accordance with the present invention.

FIGS. 3A, 3B, and 3C are end views and a cross-sectional view, respectively, of the particle neutralizing apparatus of FIG. 2; the cross-sectional view taken through one of the electrodes located towards the middle of the particle neutralizing apparatus of FIG. 2.

FIG. 4 is a diagram showing the electric field set up with the electrodes operational in the particle neutralizing apparatus of FIG. 2.

FIG. 5 is a more detailed cross-sectional illustration of the particle neutralizing apparatus of FIG. 2 in accordance with the present invention.

FIG. 6 is a cross-sectional illustration of an alternate embodiment of the particle neutralizing apparatus of FIG. 2 in accordance with the present invention.

FIG. 7 is a cross-sectional illustration of a portion of yet another alternate embodiment of the particle neutralizing apparatus of FIG. 2 in accordance with the present invention.

FIG. 8 is a block diagram of a system for detecting and characterizing small particles using a neutralizing apparatus in accordance with the present invention.

DETAILED DESCRIPTION OF THE EMBODIMENTS

The present invention shall be described generally with reference to FIG. 1. Thereafter, various embodiments shall be described with reference to FIGS. 2–8. One skilled in the art will recognize that elements from one embodiment of the present invention may be used in combination with elements of one or more other embodiments, and further that the present invention is not limited to the specific illustrative embodiments described herein but only as described in the accompanying claims.

The present invention is directed to apparatus and methods for neutralizing a charged discharge, i.e., a discharge of droplets, particles, or combinations thereof. FIG. 1 shows a neutralizing apparatus 2 having an opening 3 for receiving a highly charged discharge 7 from a source 4, e.g., an electrospray device. The highly charged discharge 7 flows in a first direction towards the outlet 6 of neutralizing apparatus 2. Counter to the flow of the highly unipolarly charged discharge is a unipolar stream of ions 8 having a polarity opposite that of the charged discharge 7. The stream of unipolar ions is directed towards the inlet 3 of the neutralizing apparatus 2 with use of an electric field set up in the neutralizing apparatus by generally representative elements 9 in FIG. 1, e.g., an electrode configuration. The stream of unipolar ions is directed towards the inlet 3 such that the ions flow counter to the stream of charged discharge 7. In this manner, the neutralizing apparatus 2 can be used for neutralizing the unipolarly charged discharge 7. For example, the electrospray device, as described in the Background of the Invention section herein, produces very highly charged particles which typically carry about 80% to about 95% of the Rayleigh limit of charge. Such highly charged particles can be neutralized according to the present invention. However, one skilled in the art will recognize that lesser charged particles can also be neutralized according to the present invention.

The neutralizing apparatus 2 receives the charged discharge 7 from the charged particle source 4 through the inlet 3. The charged discharge 7 is immediately immersed in the unipolar ions 8 of opposite polarity which are directed counter to the flow of the charged discharge 7. The charged discharge 7 collides with the unipolar ions 8 resulting in rapid discharging of the charge on the charged discharge 7. A neutralized stream is then provided at outlet 6. With such rapid neutralization, particle loss to the walls of a neutralizing apparatus 2 will be substantially reduced. Therefore, the neutralizing apparatus 2 results in a higher output of neutralized particles at outlet 6 of the neutralizing apparatus 2 relative to other conventional neutralizing apparatus.

Although the present invention is advantageous in the neutralization and provision of submicron particles at outlet 6 of the neutralizing apparatus 2 (i.e., particles having a nominal diameter of less than 1 micron), the advantages are even greater for the neutralization and provision of nanometer particles (i.e., particles having a nominal diameter of less than about 100 nanometers).

The source 4 for providing the charged discharge 7 to neutralizing apparatus 2 may be any source suitable for providing a charged discharge, i.e., particles, droplets, or combinations thereof. Preferably, the source 4 is an electrospray device which provides a unipolarly charged electrospray. The electrospray provided may include either droplets encompassing one or more particles and/or charged particles themselves. Further herein, the particles and/or droplets encompassing such particles 7 is referred to as a charged discharge. A charged discharge is meant to include droplets encompassing particles, particles resulting from the evaporation of the liquid of droplets, a stream of a unipolarly charged aerosol, charged particles from an aerosol generator, naturally charged particles such as charged particles in work environments, charged particles in emissions from engines, etc. Many types of discharges may be charged according to the present invention (e.g., polystyrene, silver, biological material, etc.), and the present invention is not limited in any particular type of discharge.

As further described below, the elements 9 for generating an electric field to direct the unipolar ions toward the inlet 3 of the neutralizing apparatus 2 may take one of many forms. For example, as further described below, the elements include electrode rings, a liner of resistive material, or any other configuration suitable for setting up a uniform electric field to direct the unipolar ions toward the inlet 3. Further, the unipolar ions may be provided by various sources such as ionizing radiation, for example, radioactive polonium emitting alpha particles or a photon ionization source, or any other source of ions such as a corona discharge. The use of such sources of ions shall be further described below.

The source 4 for the charged discharge 7 may be, for example, the electrospray apparatus as described in U.S. Pat. No. 5,247,842. Such an electrospray device shall be described further below with reference to FIG. 8.

One embodiment of a neutralization apparatus 10 is shown in and shall be described with reference to FIGS. 2–5. The neutralization apparatus 10 includes an elongated neutralizer housing 12 having a longitudinal axis 11 extending therethrough. The neutralizer housing 12 includes a generally tubular housing member 14 lying along the longitudinal axis 11 which defines at least a portion of a neutralization zone or volume 13. The neutralizer housing 12 further includes a first annular end member 16 and a second annular end member 18. The first annular end member 16 is connected and sealed to one end of the tubular housing member 14 using fastener 17 and seal element 72, and the second annular end member 18 is connected to the other end of the tubular housing member 14 with fasteners 19 and seal element 73. One skilled in the art will recognize that any sort of connection elements may be used in the construction of the neutralization apparatus and that the neutralizer housing may be constructed as a single element or any other number of elements or members.

Further, the housing 12 may be constructed of any number of nonconductive materials such as plexiglas, ceramic, etc. If the housing is formed of a high temperature insulative material, e.g., a high temperature plastic or a ceramic material, the neutralizing apparatus 10 can be baked prior to neutralization processes being performed. Such baking, together with the use of high purity gases, allows ions of known species to interact with the charged discharge received by the neutralizing apparatus 10.

An inlet 22 is defined in the first end member 16 of the neutralizer housing 12 for receiving a charged discharge 20. The charged discharge 20, as shown in FIG. 2, is a unipolarly charged (negative) stream of particles or droplets encompassing particles flowing towards an outlet 26 defined in the second end member 18 of the neutralizer housing 12 for allowing exit of neutralized particles 24. The neutralizer housing 12 defines an obstruction-free neutralization zone 13 extending from the inlet 22 to the outlet 26. The flow of the unipolarly charged particles or discharge 20 has an unobstructed path along the longitudinal axis 11 of the neutralizing apparatus 10.

The inlet 22 is defined by an annular inlet member 23 that is concentric with the first end member 16 about the longitudinal axis 11. A portion of the annular inlet member 23 extends beyond the opening 25 defined in the first end member 16 to facilitate connection of the apparatus 10 to equipment providing the charged discharge 20. A portion 27 of the annular end member 23 extends to the interior of the first end member 16 for defining an annular cavity 34 with a portion of the first end 16 and an annular metal screen 36. The cavity 34 is for receiving air or gas 28 through air inlet 30 defined in the first end 16. The portion 27 of the annular inlet member 23 is tapered to promote movement of the air or gas 28 in the cavity 34 towards the conductive screen 36 (e.g., a low porosity screen, sintered metal, perforated metal, or the like) such that an annular clean air sheath 52 is provided between the charged discharge 20 or other particles flowing along longitudinal axis 11 and the neutralizer housing 12. In other words, the annular air sheath 52 surrounds the charged discharge 20 in the neutralization zone 13 preventing particles therein from migrating to the inner surface 47 of the neutralizer housing 12. This minimizes loss of particles to the inner surface 47 of the neutralizer housing 12. The clean sheath 52 flows substantially parallel to the longitudinal axis 11 adjacent the inner surface 47 from the metal screen 36 to the outlet 26. The clean sheath 52 may be created using any inert gas (e.g., nitrogen, helium, argon), particle free air, or the like. The clean air sheath 52 is preferably attained by providing a flow of air or gas 28 that is equal to or greater than about 2 times the flow of the charged discharge 20 entering the inlet 22. Further, the clean sheath 52 may be a heated clean sheath to promote evaporation within the neutralization apparatus 10.

The outlet 26 is defined by an annular outlet member 27 that is concentric with the second end member 18 about the longitudinal axis 11. A portion of the annular outlet member 27 extends beyond the opening 35 of the first end member 18 to facilitate connection of the apparatus 10 to equipment to which the stream 24 of neutralized aerosol particles is provided, e.g., DMPS, CPC, etc.

The size of the tubular housing member 14 is selected such that losses of the charged discharge 20 received at inlet 22 to inner surface 47 of neutralizer housing 12 is minimized. In other words, the size of the tubular housing member 14 is selected so that the charged discharge does not reach the wall and result in particle loss. Preferably, the diameter of the tubular housing member 14 and diameter of the inlet 22 is selected such that the mean velocity of the clean sheath is approximately the same as the mean velocity of the charged discharge. The residence time of particles in the housing is at least in part dependant on the mean velocity of the charged discharge, the mean velocity of the air sheath, and the cross-section area of the tubular housing member 14.

The neutralizing apparatus 10 further includes an ion source 38 for use in providing the stream of unipolar ions to the neutralization zone 13. In this particular embodiment, the ion source 38 is a radioactive source used to produce bipolar ions positioned in an indented annular slot 63 in tubular housing member 14. For example, the radioactive source may be polonium-210, carbon-14, Kr-85, Ni-63, Am-241, or any other known and suitable radioactive source for providing bipolar ions. Because of the efficiency of the neutralizing apparatus 10, the source strength of the radioactive source needed to provide for neutralization and preferred output of neutralized particles is minimized. The source strength of the radioactive source is preferably less than about 3 millicuries and more preferably less than or equal to about 0.5 millicuries.

Figure 2:
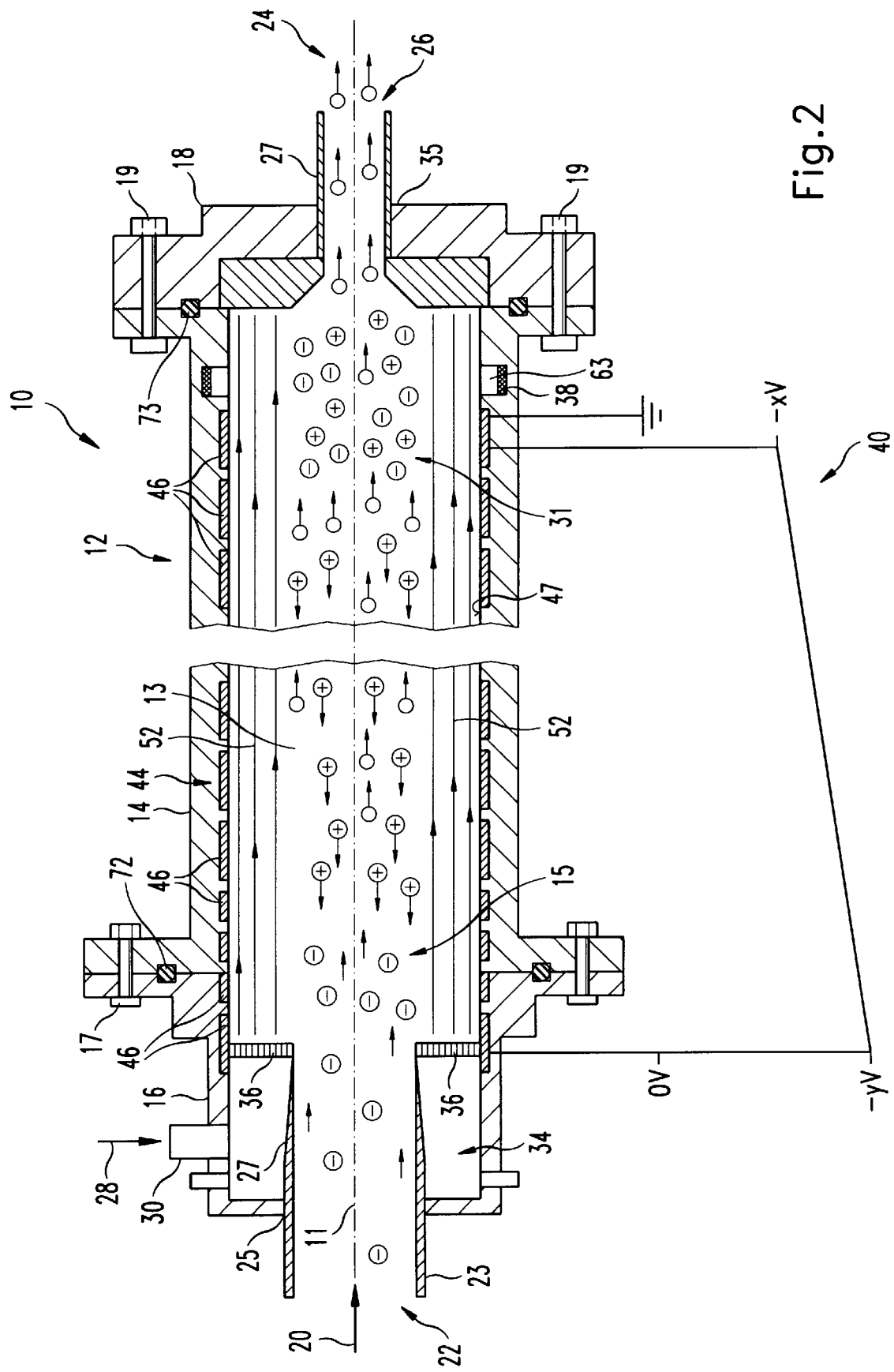

The indented annular slot 63 in tubular housing member 14 is positioned in proximity to the outlet 26 of the neutralizer housing 12 along the inner surface 47 of the tubular housing member 14. A confined uniform electric field is set up as described further below. The uniform electric field causes ions of one polarity (positive, as shown in FIG. 2) to be pushed towards the inlet 22 of neutralizing apparatus 10 along longitudinal axis 11. As such, the directing of unipolar ions towards inlet 22 provides a flow counter to the flow of charged discharge 20 flowing along longitudinal axis 11. The stream of unipolar ions directed towards the inlet 22 by the electric field in the neutralization zone 13 collides with the charged discharge 20. As such, the collisions cause the charged discharge 20 to be neutralized. The neutralization tends to occur in a neutralization region 15 of the neutralization zone 13 as the unipolar ions approach inlet 22. A bipolar ion region 31 is maintained proximate the outlet 26 and the radioactive source 38. Therefore, as charged discharge is received into the neutralization zone 13, it enters neutralization region 15 whereupon collisions with unipolar ions of opposite charge neutralize the charged discharge 20. As the neutralized discharge proceeds through neutralization zone 13, further evaporation occurs resulting in neutralized particles flowing into bipolar ion region 31. As the bipolar ion region 31 is maintained with both negative and positive ions, the neutralized particles are not overcharged to one polarity or the other prior to exiting through outlet 26.

Figure 4:
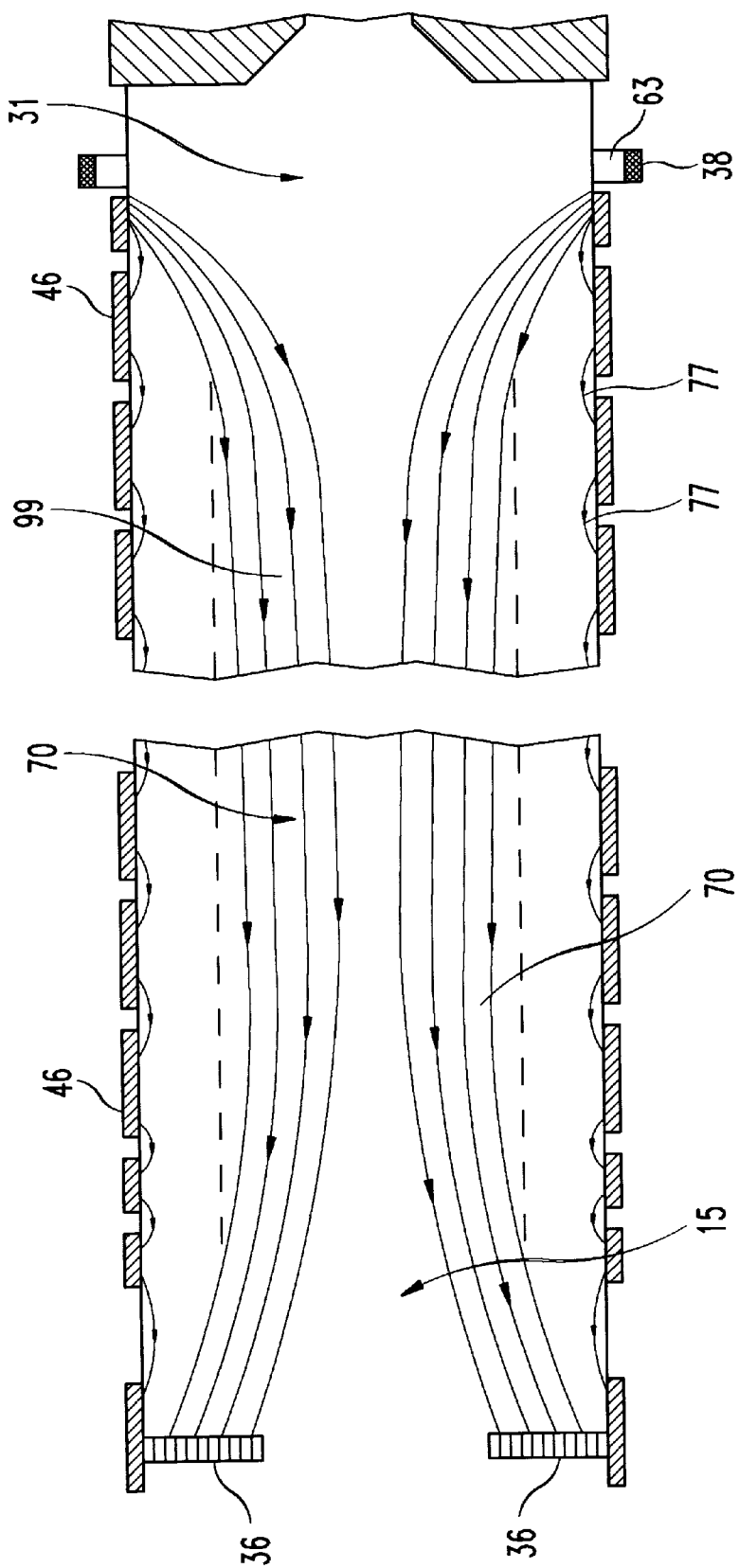

Generally, the confined uniform electric field, which is substantially parallel to longitudinal axis 11 used for directing the unipolar ion stream towards inlet 22, is generated using a drifting tube electrode configuration 44. The confined uniform electric field 70 is generally shown in FIG. 4 with the field being set up by utilizing annular insulating ring electrodes 46 distributed along longitudinal axis 11. The ring electrodes are preferably placed equal distances apart. Any suitable number of ring electrodes may be used to create the field, preferably 5 or more ring electrodes.

Voltages, ramped in level from inlet to outlet, are applied to the electrodes 46 by one or more power sources generally represented by reference arrow 40 pointing out the various voltages being applied. In other words, as shown in FIG. 1, the ring electrode 46 proximate the outlet has an applied voltage of $-x$ volts, and the ring electrode proximate the inlet 22 has an applied voltage of $-y$ volts. The ring electrodes 46 between the inlet and outlet have an applied voltage somewhere between $-x$ volts and $-y$ volts in a ramped manner. With the voltage proximate screen 36 being more negative than proximate the outlet 26, positive ions are directed towards inlet 22. With the DC voltages applied, the drifting tube electrode configuration 44 allows a confined uniform electric field 70 to be set up parallel to the flow of the charged discharge 20 entering inlet 22 and is suitable for directing a stream of unipolar ions of opposite polarity towards the charged discharge 20 or inlet 22.

One skilled in the art will recognize that the negative or positive nature of the voltages applied will cause the unipolar ions in the neutralization region 15 to be either positive or negative when a bipolar source is used. The reversal of the voltages applied, including the reversal of ramped nature of such voltages throughout the description herein, are contemplated within the scope of the present invention to achieve both positive and negative ion neutralization of oppositely charged discharges. The particular voltages used for illustration herein are not to be construed as being unduly limiting to the present invention, as the present invention is limited only in accordance with the accompanying claims.

When the charged discharge 20 collides with the stream of unipolar ions flowing counter thereto in region 15, the charged discharge 20 is rapidly discharged and the neutralized particles move towards and exit through outlet 26 under the assistance of the air sheath 52.

The confined uniform electric field 70 is defined as a field which is substantially uniform in a core region 99 about the longitudinal axis 11 in the neutralization zone 13 with no uncontrolled fringing of the electric field from the core region 99 to the neutralizer housing 12. The confined field 70 is generally parallel to the longitudinal axis and in a direction towards the inlet 22. Controlled fringing between the ring electrodes 46 is shown by reference numeral 77 in FIG. 4. This fringing does not run from the core region 99 to the neutralizer housing and is controlled or confined by use of the air sheath 52. For example, the air sheath 52, the design or configuration of the neutralizer housing 12, and/or the electrode configuration, can be optimized to encompass the maximum possible field fringing of the electrodes 46 within the air sheath, e.g., the air sheath width can be set 2 times the maximum distance the fringing extends into the neutralization region 13. Such fringing does not exist with the continuous resistor layer configuration described further below with reference to FIG. 6.

Figure 3A:
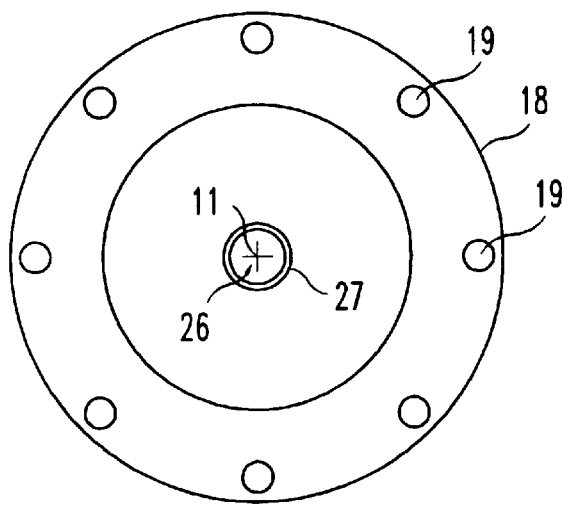
Figure 3C:
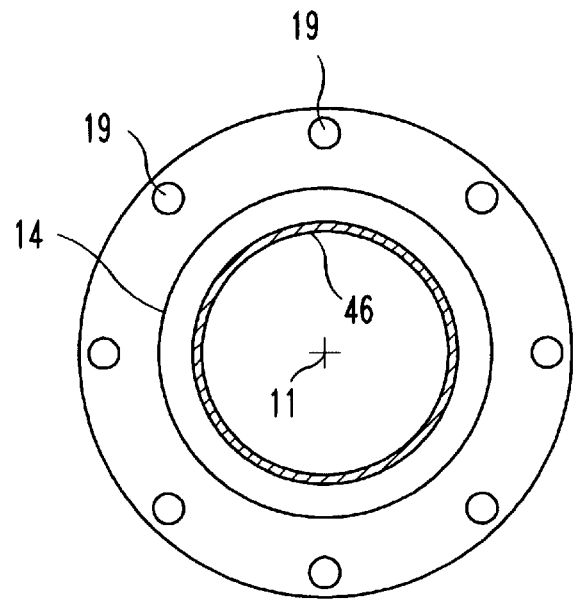
Figure 3B:
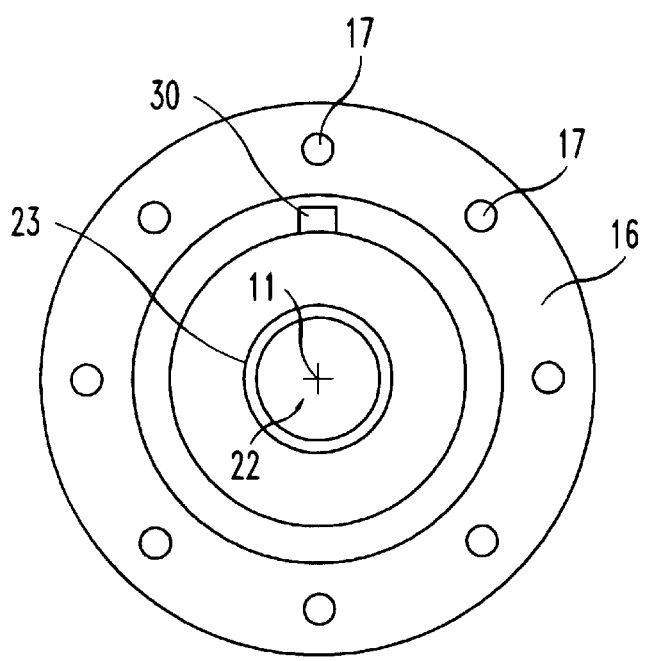

FIGS. 3A–3C are end views and a cross-sectional view, respectively, of the neutralizing apparatus 10 of FIG. 1. The cross-sectional view of FIG. 3C is taken through one of the ring electrodes 46 located towards the middle of the neutralizing apparatus 10.

Figure 5:
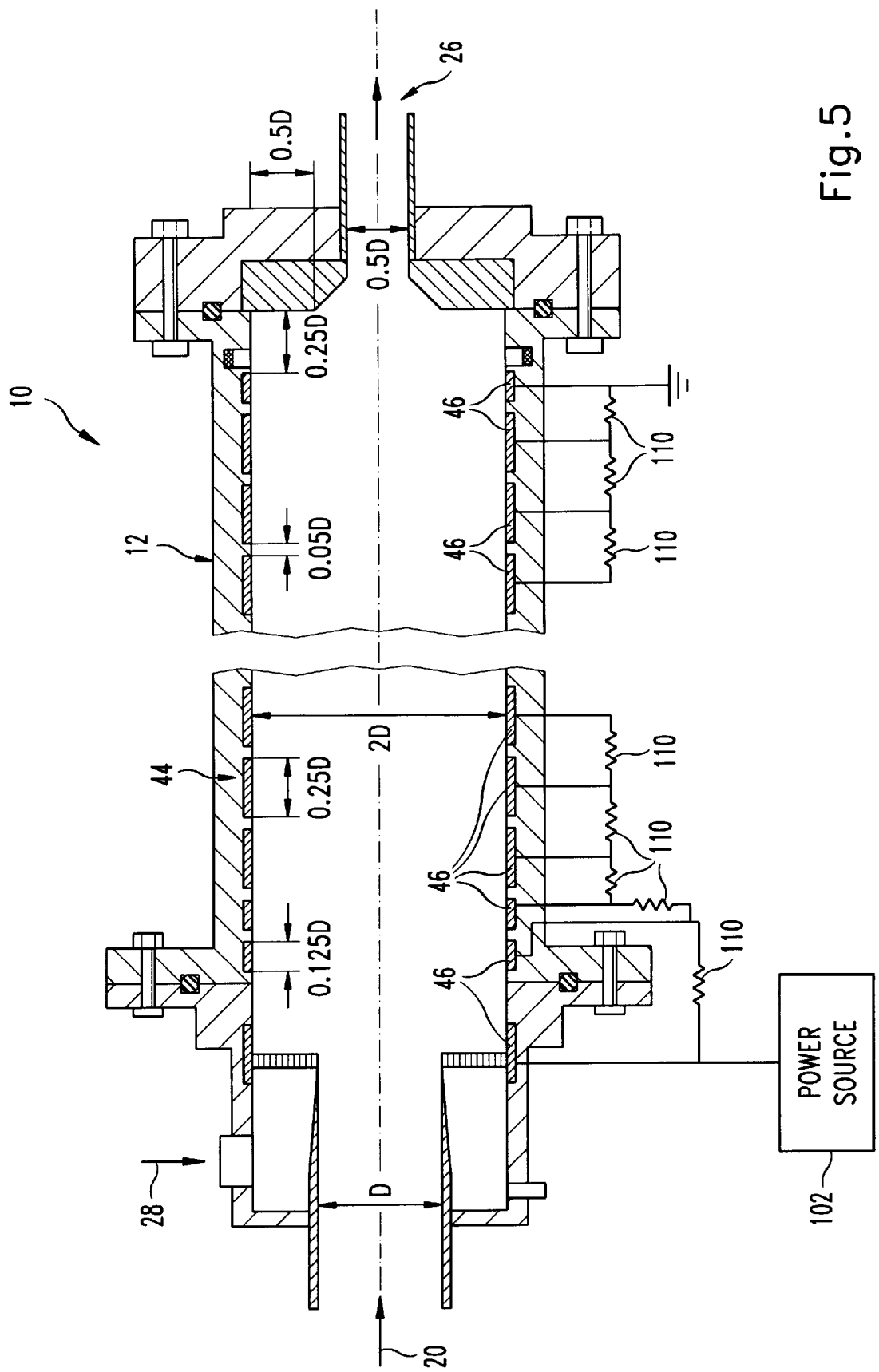

One particular embodiment of a neutralizing apparatus according to the present invention is shown in FIG. 5. This embodiment includes more detail relative to the neutralizing apparatus 10, shown in FIG. 2, and uses the same reference numerals as used therein to designate same or similar elements. The neutralizing apparatus 10, as shown in FIG. 5, includes a ring electrode configuration 44 such as described with reference to FIG. 2. In this more detailed illustration of the apparatus of FIG. 2, the voltages are applied to the various electrodes using a single power source 102. The voltage ramp of the ring electrodes 46 is set up by placing resistors 110 between adjacent electrode rings 46. The electrode 46 proximate outlet 26 is connected to ground.

In alternate configurations with respect to all the illustrative embodiments described herein, the power source for applying voltages to the various electrodes may be AC sources. When AC voltages are applied, an oscillating electric field is generated. For example, with such an oscillating electric field, bursts of positively charged ions and negatively charged ions are alternately directed into neutralization region 15. In this manner, charged discharges other than unipolarly charged discharges can be neutralized effectively. The power source 102 is meant to represent either the application of DC or AC voltages.

Figure 6:
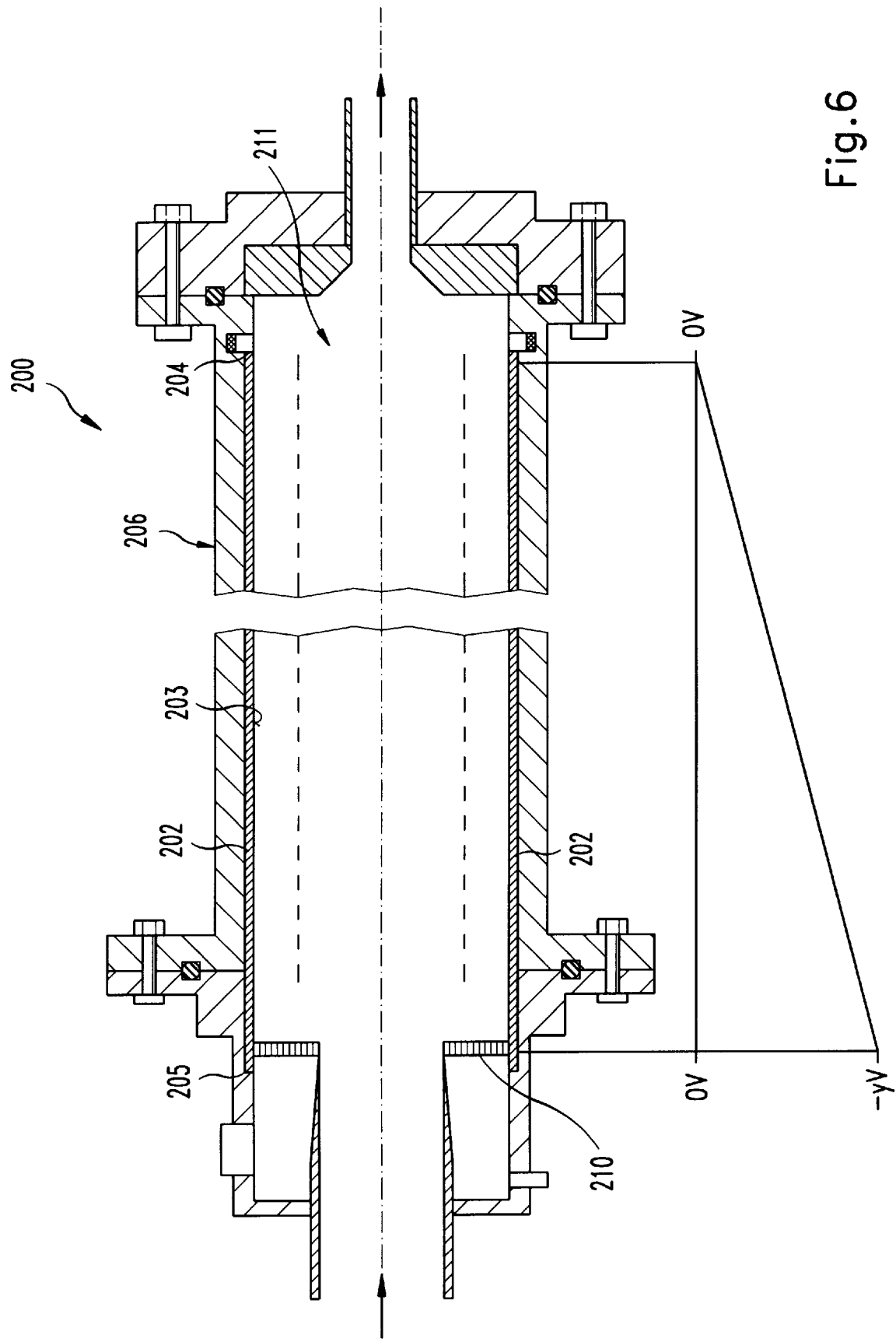

The configured electric field 70 (FIG. 4) can also be set up using the alternate drifting tube electrode configuration shown in the illustration of FIG. 6. As shown therein, the ring electrodes are replaced by thick film resistor 202 of uniform thickness on a portion of the nonconducting inner surface 203 of a neutralizer housing 206. The resistor layer 202 extends from a first end 204 to a second end 205 which is connected to the metal screen 210. When a voltage is applied to the second end 205 of the resistor layer 202, the voltage ramps (e.g., becomes less negative) along the axial direction towards the second end 204, which is adjacent electrode 209 that is electrically grounded. This electrode configuration also provides a confined uniform electric field in region 211 parallel to the flow of charged discharge 20 and suitable for directing a unipolar stream of ions counter to the charged discharge flow.

Figure 7:
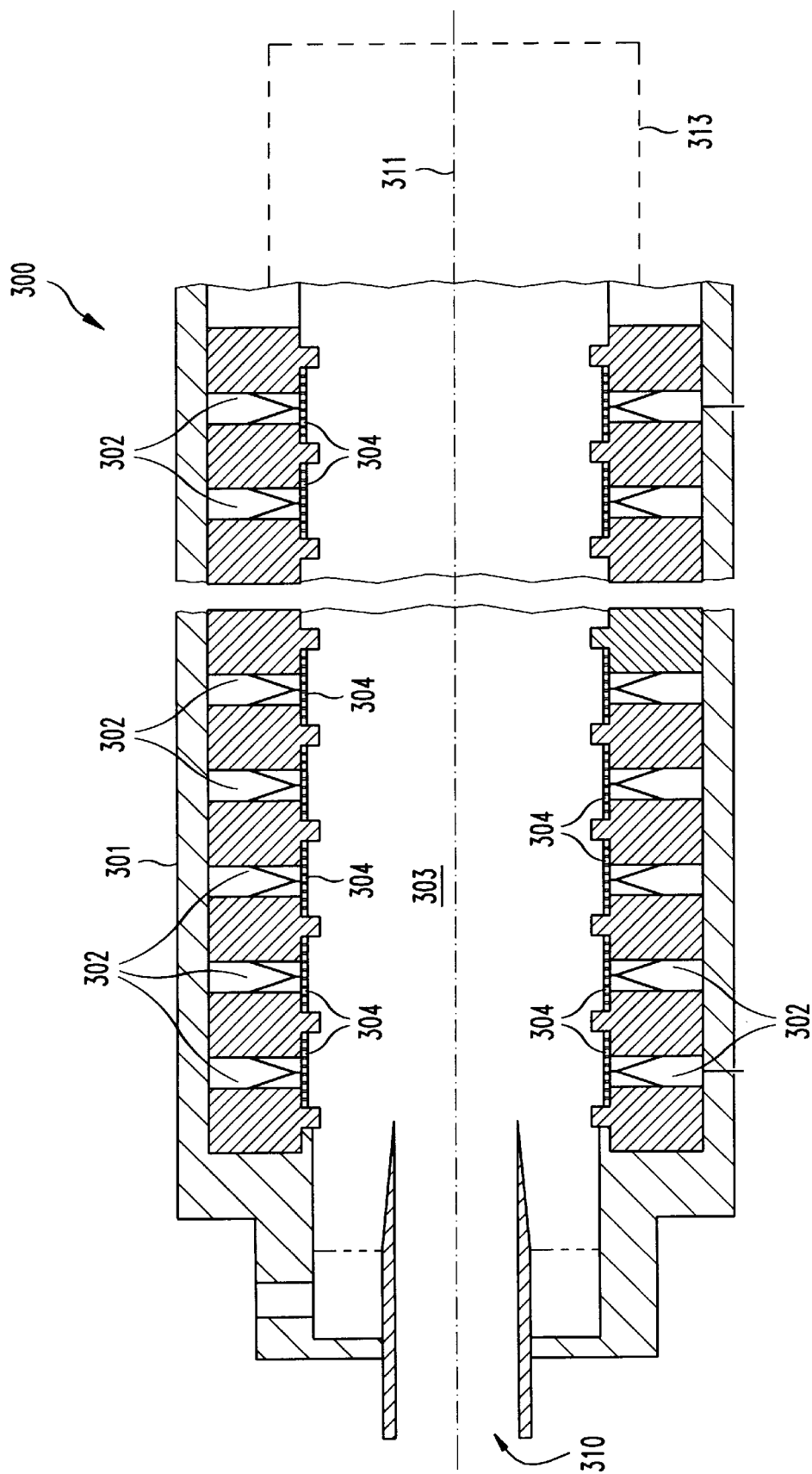
Figure 8:
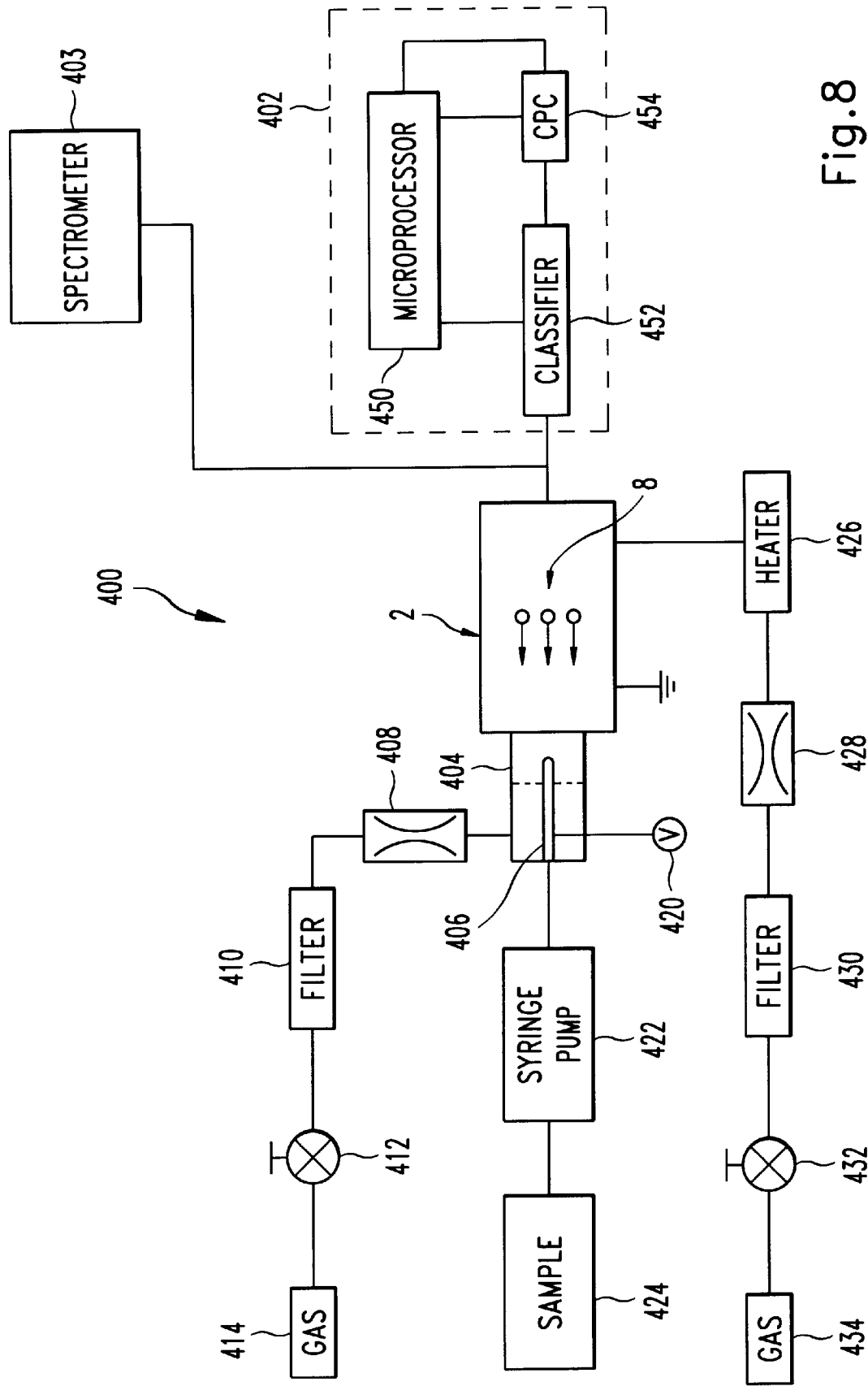

In another alternate illustration of a portion of a neutralizing apparatus 300, shown in FIG. 7, the neutralizer housing 301 defines a neutralization zone 303. Corona discharge rings or discs 302 having a sharpened edge are distributed along the housing 301 for providing free electrons and/or ions to the neutralization zone 303. The free electrons and/or ions are then used for neutralizing the stream of charged particles 310 flowing along longitudinal axis 311 of the apparatus 300. The corona discharge rings or discs have a high voltage applied thereto (e.g., negative or positive). A plurality of perforated or porous metal plates or screens 304 are distributed along the housing 301 between the sharpened edges of the corona discharge discs and the neutralizing zone 303. The perforated plates 304 allow the corona discharge to be formed about the sharpened edge with free electrons and/or ions being drawn into the neutralization zone 303. The perforated plates 304 having ramp voltages applied thereto create the confined electric field, as described previously with respect to other embodiments herein, in addition to providing a lower reference voltage relative to the high voltage applied to the corona discharge elements for creation of the corona discharge. However, since this embodiment provides for a high concentration of free electrons along the entire neutralization zone 303, directing of the free electrons towards the inlet of the apparatus 300 may not be necessary. As this particular embodiment does not provide for a bipolar ion region to prevent overcharging of particles that have been neutralized prior to exit of neutralizing apparatus 300, the concentration of ions in the neutralization zone 303 must be controlled. In other words, the concentration of free electrons and/or ions in the neutralization zone 303 must be kept at a certain level such that particles exiting the neutralization apparatus 300 are not charged after being neutralized prior to exit from the apparatus 300. Alternatively, to prevent overcharging, a bipolar ion region 313 may be positioned adjacent the exit to avoid overcharging from the neutralizing apparatus 300. For example, a radioactive source may be used to provide bipolar ions in this region 313.

FIG. 8 shows a system for detecting and characterizing particles using a neutralization apparatus 2 and having an electric field for directing a stream of unipolar ions toward the inlet of the neutralization apparatus 2, as described previously herein. The system 400, other than the neutralizing apparatus 2, is described in further detail in U.S. Pat. No. 5,247,842, and shall not be described in detail herein. It will be recognized by one skilled in the art that the various components or elements described for providing an electrospray to neutralization apparatus 2, including heaters for providing evaporation and also elements for receiving the neutralized particles, may be or take many different forms. However, as shown in FIG. 8, the system 400 includes particles as part of a liquid sample or solution held in a container 424. A syringe pump 422 loaded with liquid from the container supplies the liquid to an electrospray chamber 404. Another input to electrospray chamber 404 is a steady rate supply of filtered gas, typically air. More particularly, air under pressure in a container 414 is provided through a valve 412 to a filter 410, and then via controlling orifice 408 to the electrospray chamber 404. Such gas may also be heated. A high voltage source 420 is electrically connected to a capillary needle 406 of the electrospray device 404 while portions of the electrospray device are isolated from the needle and are connected to ground. To provide the electrospray, a high potential difference between the needle 406 and an isolated portion is provided. It will also be recognized that air from a supply 434 may be directed through a valve 432, a filter 430, and a controlling orifice 428 to a heater 426 to be provided to the neutralizing apparatus 2 to maintain the temperature within the neutralizing apparatus 2. This promotes evaporation of droplets of the liquid sample.

Further, the system 400 includes an output from the neutralizing apparatus 2 which is provided to a differential mobility particle sizer (DMPS) 402 and/or a charge spectrometer 403. The DMPS consists of an electrostatic classifier 452, a condensation particle counter 454, and a suitable microcomputer 450. Such components for use in sizing and classifying particles are available from TSI Incorporated. The charge spectrometer 403 is used to provide a charge distribution of the stream of particles exiting the neutralizing apparatus 2.

Almost immediately, as droplets emerge from capillary needle 406 of electrospray device 404, the solution droplets begin to shrink due to evaporation of the volatile solvent of the sample solution. If each of the droplets were to retain its electrical charge, the surface charge density would increase as the droplet size is reduced. Eventually, the coulombic forces would overcome cohesive forces, such as surface tension, causing each droplet to disintegrate into a plurality of smaller droplets. Coulomb disintegration, occurring generally throughout the aerosol, would destroy the size uniformity of the droplets. With the use of the neutralizing apparatus 2, in accordance with the present invention, the unipolar stream of ions encounter the droplets from the electrospray device 404 and reduce their electrical charge at the inlet, neutralizing such droplets. This minimizes the potential for droplet disintegration due to coulombic forces as the droplet proceeds and evaporates in the neutralizing apparatus 2. Further, by neutralizing the charged spray immediately after discharge into the neutralizing apparatus, particle loss to the walls of the neutralizing apparatus 2 are reduced.

All patents and references disclosed herein are incorporated by reference in their entirety, as if individually incorporated. Further, although the present invention has been described with particular reference to various embodiments thereof, variations and modifications of the present invention can be made within the contemplated scope of the following claims, as is readily known to one skilled in the art.

What is claimed is:

1. A method for use in neutralizing a charged discharge, the method comprising the steps of:

providing a neutralizer housing having a longitudinal axis extending between an inlet and an outlet of the neutralizer housing;

introducing a charged discharge having a first polarity into the inlet of the neutralizer housing for flow parallel to the longitudinal axis from the inlet to the outlet; and directing a stream of unipolar ions having a second polarity opposite the first polarity to flow parallel to the longitudinal axis of the neutralizer housing towards the inlet for use in neutralizing the charged discharge.

2. The method according to claim 1, wherein the step of directing the stream of unipolar ions includes creating a confined electric field within the housing parallel to the longitudinal axis for directing the stream of unipolar ions towards the inlet for use in neutralizing the charged discharge.

3. The method according to claim 2, wherein the step of creating the confined uniform electric field within the housing includes the steps of:

positioning a plurality of ring electrodes along the longitudinal axis; and applying a plurality of voltages ramped in level from a first ring electrode to a last ring electrode of the plurality of ring electrodes lying along the longitudinal axis.

4. The method according to claim 2, wherein the neutralizer housing includes a nonconducting tubular portion having an inner surface, and further wherein the step of creating the confined uniform electric field within the housing includes the steps of:

providing a layer of resistive material having a first end and a second end, the layer of resistive material extending along a length of the inner surface of the nonconducting tubular portion;

applying a voltage to the first end; and grounding the second end.

5. The method according to claim 2, wherein the stream of unipolar ions is provided by positioning a radioactive source in proximity to the outlet of the neutralizer housing to generate bipolar ions, and further wherein the confined electric field directs ions of a first polarity forming the stream of unipolar ions in a flow parallel to the longitudinal axis of the neutralizer housing towards the inlet with bipolar ions remaining proximate the outlet.

6. The method according to claim 5, wherein the radioactive source has a radioactivity of less than about 3 millicurie.

7. The method according to claim 1, wherein the method further includes creating a clean sheath between the charged discharge and the neutralizer housing.

8. The method according to claim 1, wherein the stream of unipolar ions is provided by one or more corona discharge electrodes having a voltage applied thereto.

9. The method according to claim 1, wherein the charged discharge includes at least one of a plurality of particles and a plurality of droplets suspending a plurality of particles.

10. A neutralizing apparatus, the apparatus comprising:

an elongated neutralizer housing having a longitudinal axis extending between an inlet and an outlet defined therein, the inlet for receiving a charged discharge; and an electrode configuration operable to create a confined uniform electric field within the neutralizer housing for use in directing a stream of unipolar ions to flow parallel to the longitudinal axis of the neutralizer housing towards the inlet.

11. The apparatus according to claim 10 wherein the apparatus further includes means for creating a clean sheath between the charged discharge and the neutralizer housing.

12. The apparatus according to claim 10, wherein the elongated neutralizer housing includes an annular housing extending between the inlet and the outlet with the longitudinal axis extending therethrough, and further wherein the apparatus includes an annular inlet member at the inlet sized to provide the charged discharge into a neutralization zone defined by the annular housing, the apparatus further includes a gas inlet cavity defined between the annular housing and the annular inlet member for receiving a gas and directing the gas between the charged discharge flowing parallel to the longitudinal axis and the annular housing.

13. The apparatus according to claim 10, wherein the electrode configuration includes:

a plurality of ring electrodes located along the longitudinal axis; and one or more power sources for use in applying a plurality of voltages ramped in level from a first ring electrode to a last ring electrode of the plurality of ring electrodes lying along the longitudinal axis.

14. The apparatus according to claim 10, wherein the elongated neutralizer housing includes a nonconducting tube portion having an inner surface, wherein the electrode configuration includes a layer of resistive material having a first end and a second end located along a length of the inner surface of the nonconducting tube portion, and further wherein a power source is connected for use in applying a voltage to the first end with the second end grounded.

15. The apparatus according to claim 10, wherein the stream of unipolar ions is provided by positioning a radioactive source in proximity to the outlet of the neutralizer housing to generate bipolar ions, and further wherein the confined electric field directs ions of a first polarity forming the stream of unipolar ions directed towards the inlet with bipolar ions remaining proximate the outlet.

16. The apparatus according to claim 10, wherein the apparatus further includes one or more corona discharge electrodes for use in providing the stream of unipolar ions.

17. The apparatus according to claim 10, wherein the charged discharge includes at least one of a plurality of particles and a plurality of droplets containing a plurality of particles.

18. A neutralizing apparatus comprising:

an elongated neutralizer housing having a longitudinal axis extending between an inlet and an outlet defined therein, the inlet for receiving a charged discharge and the outlet for allowing neutralized particles to exit the neutralizer housing;

means for creating a confined electric field within the housing parallel to the longitudinal axis for use in directing a stream of unipolar ions to flow parallel to the axis of the neutralizer housing toward the inlet; and means for creating a clean sheath between the charged discharge and the neutralizer housing.

19. An apparatus for generating an aerosol, the apparatus comprising:

a device for providing a charged discharge at an outlet thereof, the charged discharge including electrically charged droplets having a first charge associated therewith;

an evaporation neutralization housing for reducing the size of the droplets, the housing having an inlet and an outlet, the inlet proximate the device outlet; and an electrode configuration associated with the evaporation neutralization housing to create a uniform electric field within the housing for directing a stream of unipolar ions towards the inlet of the housing proximate the outlet of the device.

20. The apparatus according to claim 19, wherein the stream of unipolar ions is provided by positioning a radioactive source in proximity to the outlet of the housing to generate bipolar ions, and further wherein the electric field directs unipolar ions of the bipolar ions towards the inlet with bipolar ions remaining proximate the outlet.

21. The apparatus according to claim 19, wherein the radioactive source has a radioactivity of less than about 3 millicurie.

* * * * *